(12) United States Patent
Fujii

(10) Patent No.: US 11,376,731 B2
(45) Date of Patent: Jul. 5, 2022

(54) ARTICULATED ROBOT AND METHOD OF ESTIMATING REDUCED STATE OF GAS IN GAS SPRING OF THE ARTICULATED ROBOT

(71) Applicant: KAWASAKI JUKOGYO KABUSHIKI KAISHA, Kobe (JP)

(72) Inventor: Yusuke Fujii, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/054,401

(22) PCT Filed: May 9, 2019

(86) PCT No.: PCT/JP2019/018591
§ 371 (c)(1),
(2) Date: Nov. 10, 2020

(87) PCT Pub. No.: WO2019/216382
PCT Pub. Date: Nov. 14, 2019

(65) Prior Publication Data
US 2021/0069919 A1 Mar. 11, 2021

(30) Foreign Application Priority Data

May 10, 2018 (JP) .............................. JP2018-091629

(51) Int. Cl.
*B25J 9/12* (2006.01)
*B25J 9/04* (2006.01)
(Continued)

(52) U.S. Cl.
CPC ............... *B25J 9/126* (2013.01); *B25J 9/04* (2013.01); *B25J 9/1633* (2013.01); *B25J 13/087* (2013.01); *B25J 13/088* (2013.01); *B25J 19/0016* (2013.01)

(58) Field of Classification Search
CPC ... B25J 9/04; B25J 9/126; B25J 9/1633; B25J 13/087; B25J 13/088; B25J 19/0012; B25J 19/0016
See application file for complete search history.

(56) References Cited

U.S. PATENT DOCUMENTS

| 6,408,225 B1 * | 6/2002 | Ortmeier .............. B25J 19/0012 192/58.62 |
| 2010/0212305 A1 * | 8/2010 | Runesson ............ B25J 19/0012 60/327 |

(Continued)

FOREIGN PATENT DOCUMENTS

| JP | 2010-284725 A | 12/2010 |
| JP | 2014-195849 A | 10/2014 |
| JP | 2017-159402 A | 9/2017 |

*Primary Examiner* — Dale Moyer
(74) *Attorney, Agent, or Firm* — Oliff PLC

(57) ABSTRACT

A robot includes an arm supporting part, a rotary arm rotatably supported by the arm supporting part, a drive motor configured to rotate the rotary arm, a gas spring configured to reduce a load of the drive motor by supporting a load acting on the rotary arm and a controller. The controller determines that the rotary arm rotates, and estimates a reduced state of gas in the gas spring based on a comparison between an actual current value and a theoretical current value of the drive motor when the rotary arm rotates.

5 Claims, 8 Drawing Sheets

(51) Int. Cl.
*B25J 9/16* (2006.01)
*B25J 13/08* (2006.01)
*B25J 19/00* (2006.01)

(56) References Cited

U.S. PATENT DOCUMENTS

| | | | |
|---|---|---|---|
| 2014/0297032 A1* | 10/2014 | Hayashi | B25J 9/1674 |
| | | | 700/245 |
| 2014/0297037 A1 | 10/2014 | Hayashi | |
| 2017/0297199 A1* | 10/2017 | Suzuki | G05B 19/406 |
| 2019/0160676 A1* | 5/2019 | Harada | B25J 9/1666 |
| 2020/0164529 A1 | 5/2020 | Kitamura et al. | |

\* cited by examiner (a) (b)

ARTICULATED ROBOT AND METHOD OF ESTIMATING REDUCED STATE OF GAS IN GAS SPRING OF THE ARTICULATED ROBOT

TECHNICAL FIELD

The present disclosure relates to an articulated robot and a method of estimating a reduced state of gas in a gas spring of the articulated robot.

BACKGROUND ART

JP2017-159402A discloses an articulated robot. This robot includes an arm, a drive motor which rotates the arm, and a gas spring. This gas spring supports a load acting on the arm and reduces a load of the drive motor.

The gas spring generates a balancing force which reduces the load of the drive motor by a pressure of gas enclosed in the gas spring (hereinafter, may be referred to as a "gas pressure"). The gas enclosed in the gas spring leaks by the gas spring being used for a long period of time. This leak of gas reduces the gas pressure, which leads to a decrease in the balancing force generated by the gas spring. This decrease in the balancing force increases the load of the drive motor.

A control unit of this robot estimates a reduced state of gas in the gas spring. This control unit acquires an actual current value of the drive motor in a state where the drive motor is driven and the arm is stopped, estimates the reduced state of gas based on this actual current value, and notifies the reduced state of gas when the reduced state of gas becomes a given reduced state. Therefore, the robot suppresses the load of the drive motor being excessively large as a result of the leak of gas.

REFERENCE DOCUMENT OF CONVENTIONAL ART

Patent Document

[Patent Document 1] JP2017-159402A

DESCRIPTION OF THE DISCLOSURE

Problem to be Solved by the Disclosure

As described above, the robot acquires the actual current value of the drive motor in the state where the drive motor is driven and the arm is stopped. In this stopped state of the arm, a static friction force acts on the arm. The arm stops until the static friction force exceeds the maximum static friction force. In this stopped state of the arm, a variation occurs in the static friction force actually acting on the arm, which causes a variation in a torque of the drive motor when the arm stops. The variation in the torque of the drive motor also causes a variation in the actual current value of the drive motor, and thus, an accuracy of estimating the reduced state of gas lowers.

One purpose of the present disclosure is to provide a robot capable of highly precisely estimating a reduced state of gas in a gas spring, and a method of estimating the reduced state of gas in the gas spring by using the robot.

SUMMARY OF THE DISCLOSURE

An articulated robot according to the present disclosure includes an arm supporting part, a rotary arm rotatably supported by the arm supporting part, a drive motor configured to rotate the rotary arm, a gas spring configured to reduce a load of the drive motor by supporting a load acting on the rotary arm, and a controller. The controller determines that the rotary arm rotates, and estimates a reduced state of gas in the gas spring based on a comparison between an actual current value and a theoretical current value of the drive motor when the rotary arm rotates.

Another articulated robot according to the present disclosure includes an arm supporting part, a rotary arm rotatably supported by the arm supporting part, a drive motor configured to rotate the rotary arm, a gas spring configured to reduce a load of the drive motor by supporting a load acting on the rotary arm, and a controller. The controller estimates a reduced state of gas in the gas spring based on a comparison between an actual current value and a theoretical current value of the drive motor when the rotary arm does not stop but rotates.

The controller may determine a magnitude of a fluctuation in an angular acceleration of the drive motor.

The controller may use the actual current value when the rotary arm is in a posture in which the gas spring generates a torque at or above 25% of a maximum torque to be generated by the gas spring.

A method of estimating a reduced state of gas according to the present disclosure is a method of estimating a reduced state of gas in a gas spring of an articulated robot including a rotary arm, a drive motor configured to drive the rotary arm, and the gas spring configured to reduce a load of the drive motor by supporting a load acting on the rotary arm. The method includes the steps of acquiring an actual current value of the drive motor, and estimating the reduced state of gas in the gas spring based on the actual current value. The acquiring the actual current value includes acquiring the actual current value when the rotary arm rotates. The estimating the reduced state of gas includes estimating the reduced state of gas in the gas spring based on a comparison between the actual current value acquired in the acquiring the actual current value, and a theoretical current value.

Effect of the Disclosure

The robot according to the present disclosure estimates the reduced state of gas in the gas spring based on the actual current value when the rotary arm rotates. This robot estimates the reduced state of gas in the gas spring in the state where the static friction force does not act on the rotary arm. According to this robot, the reduced state of gas in the gas spring may be estimated highly precisely. According to the method of estimating the reduced state of gas by using this robot, the reduced state of gas may be estimated highly precisely.

MODE FOR CARRYING OUT THE DISCLOSURE

Figure 1:
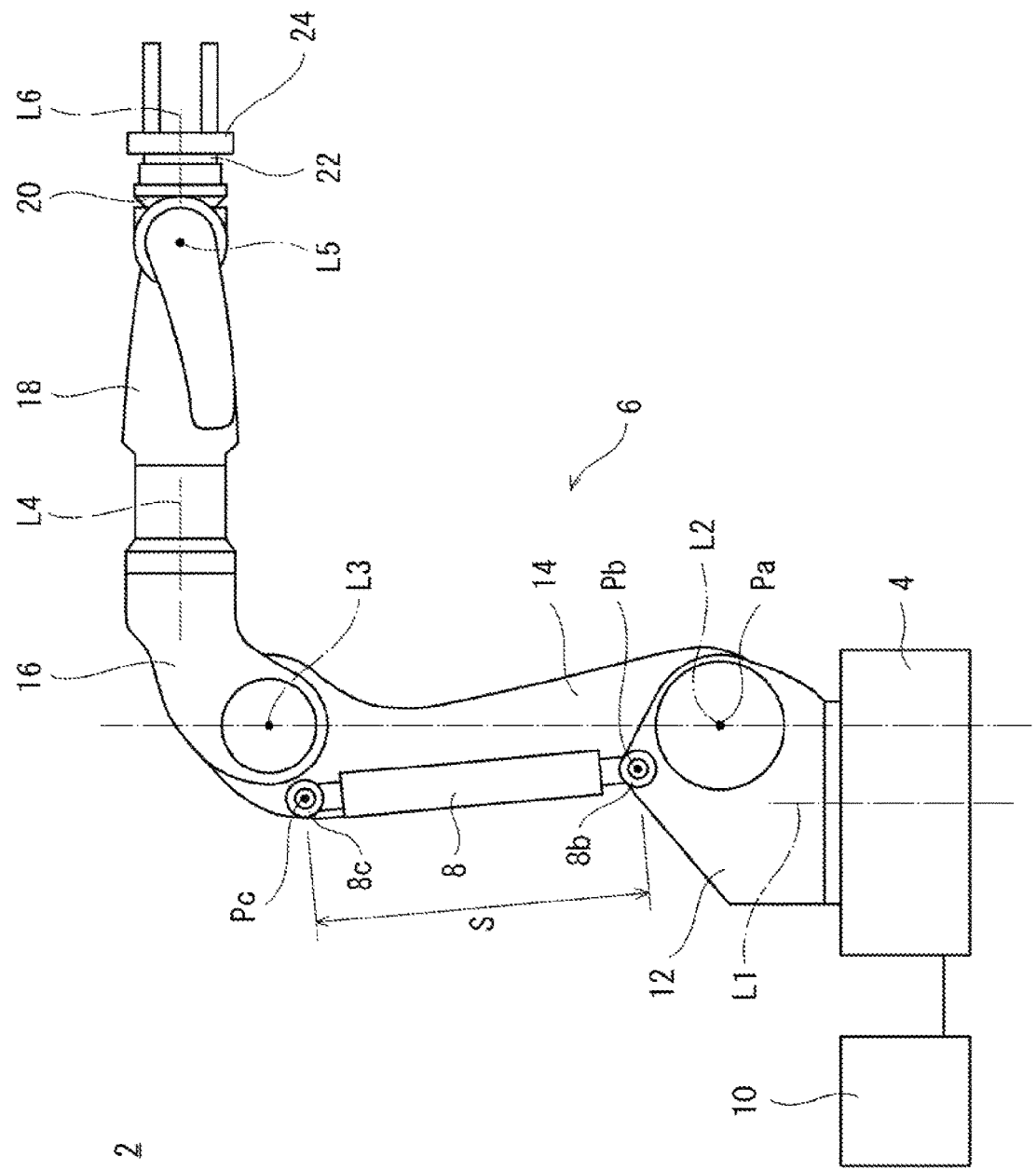
FIG. 1 is a side view illustrating an articulated robot according to one embodiment of the present disclosure.

Hereinafter, the present disclosure is described in detail based on a preferred embodiment by suitably referring to the drawings.

FIG. 1 illustrates a robot 2 according to the present disclosure. The robot 2 includes a pedestal 4, a robotic arm 6, a gas spring 8, and a controller 10. Although not illustrated, the robot 2 further includes drive motors M1 to M6, rotary sensors E1 to E6, and current sensors C1 to C6.

The robotic arm 6 includes a first arm 12, a second arm 14, a third arm 16, a fourth arm 18, a fifth arm 20, and a sixth arm 22. In the robot 2, the pedestal 4, the first arm 12, the second arm 14, the third arm 16, the fourth arm 18, the fifth arm 20, and the sixth arm 22 are serially coupled to each other. The robot 2 is provided with a plurality of joints as coupling parts of the pedestal 4, the first arm 12, the second arm 14, the third arm 16, the fourth arm 18, the fifth arm 20, and the sixth arm 22. The robot 2 is a so-called "multi-articulated robot."

In the robot 2 illustrated in FIG. 1, a hand 24 is attached to a tip-end part of the sixth arm 22. This hand 24 is provided with a function to grip a workpiece (not illustrated). The hand 24 is one example of a tool attached to the robot 2, and another tool may be attached.

In the robot 2, the first arm 12 is coupled to the pedestal 4 so as to be rotatable about a vertical axial line L1 as a rotation axis. The second arm 14 is coupled to the first arm 12 so as to be rotatable about a horizontal axial line L2 as a rotation axis. The third arm 16 is coupled to the second arm 14 so as to be rotatable about a horizontal axial line L3 as a rotation axis. The fourth arm 18 is coupled to the third arm 16 so as to be rotatable about an axial line L4 of the fourth arm 18 as a rotation axis. The fifth arm 20 is coupled to the fourth arm 18 so as to be rotatable about an axial line L5 orthogonal to the axial line L4, as a rotation axis. The sixth arm 22 is couple to the fifth arm 20 so as to be rotatable about an axial line L6 of the sixth arm 22 as a rotation axis.

Here, the present disclosure is described assuming that the second arm 14 is a rotary arm, and the first arm 12 is an arm supporting part.

The drive motor M1 has a function to rotate the first arm 12. The drive motor M1 is controlled by the controller 10. The drive motor M1 is a servomotor, for example. The drive motor M2 has a function to rotate the second arm 14. The drive motor M2 is controlled by the controller 10. The drive motor M2 is a servomotor, for example. Similarly, the drive motors M3 and M5 have functions to rotate the third arm 16 and the fifth arm 20, respectively, and the drive motors M4 and M6 have functions to rotate the fourth arm 18 and the sixth arm 22, respectively. The drive motors M3, M4, M5, and M6 are controlled by the controller 10. The drive motors M3, M4, M5, and M6 are servomotors, for example.

The rotary sensor E1 has a function to detect a rotational position of the drive motor M1. The rotary sensor E2 has a function to detect a rotational position of the drive motor M2. Similarly, the rotary sensors E3, E4, E5, and E6 have functions to detect rotational positions of the drive motors M3, M4, M5, and M6, respectively. These rotary sensors E1, E2, E3, E4, E5, and E6 are encoders, for example.

The current sensor C1 has a function to detect a current for controlling the rotation of the drive motor M1. The current sensor C2 has a function to detect a current for controlling the rotation of the drive motor M2. Similarly, the current sensors C3, C4, C5, and C6 have functions to detect currents for controlling the rotations of the drive motors M3, M4, M5, and M6, respectively.

A base-end part 8b of the gas spring 8 is attached pivotably to the first arm 12 as the arm supporting part. A tip-end part 8c of the gas spring 8 is attached pivotably to the second arm 14 as the rotary arm. The gas spring 8 is expandable and contractible between the base-end part 8b and the tip-end part 8c thereof The gas spring 8 is rotatable accompanying with the rotation of the second arm 14.

A reference character "Pa" in FIG. 1 indicates a rotary center of the second arm 14. A reference character "Pb" indicates a rotary center of the base-end part 8b of the gas spring 8. A reference character "Pc" indicates a rotary center of the tip-end part 8c of the gas spring 8. A double-headed arrow S indicates a distance from the rotary center Pb of the base-end part 8b to the rotary center Pc of the tip-end part 8c. The distance S fluctuates according to the expansion and contraction of the gas spring 8.

The controller 10 includes an input-and-output part which inputs and outputs data, a memory which stores the data, and a processor which calculates the data. The controller 10 has a function to control the rotations of the drive motors M1 to M6. The controller 10 has a function to receive information on the rotational positions of the drive motors M1 to M6 from the respective rotary sensors E1 to E6. The controller 10 has a function to identify rotational positions of the first arm 12, the fourth arm 18, and the sixth arm 22, and rotational positions of the second arm 14, the third arm 16, and the fifth arm 20. The controller 10 has a function to receive current values of the current sensors C1 to C6. The controller 10 has a function to calculate torques of the drive motors M1 to M6 based on the current values of the drive motors M1 to M6.

Figure 2:
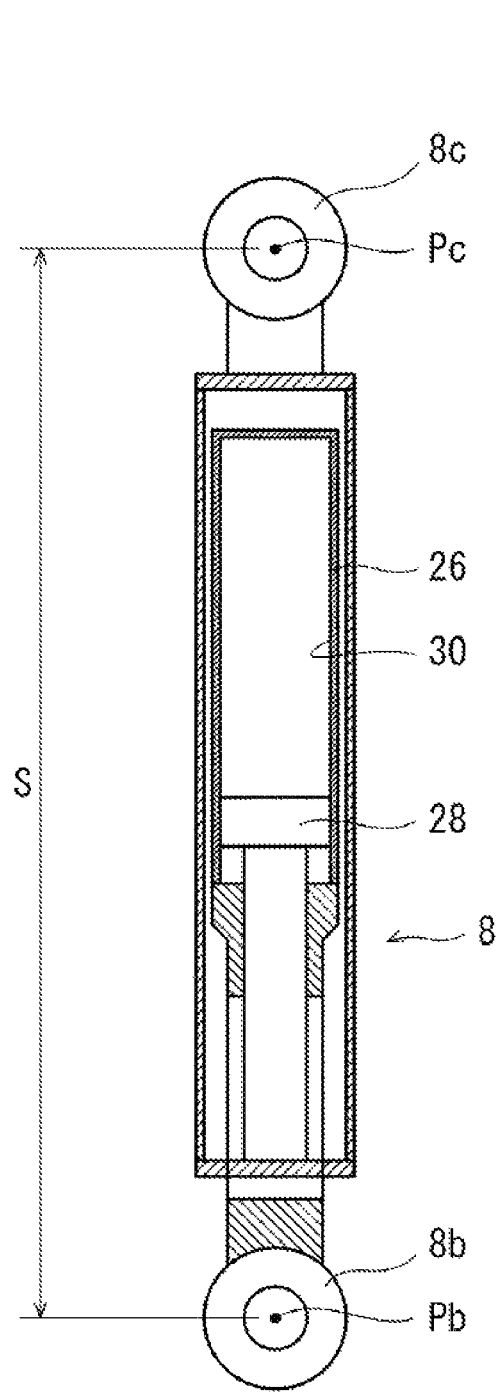
FIG. 2(a) is an explanatory view illustrating a working state of a gas spring of the robot of FIG. 1.
FIG. 2(b) is an explanatory view illustrating another working state of the gas spring.
Figure 2:
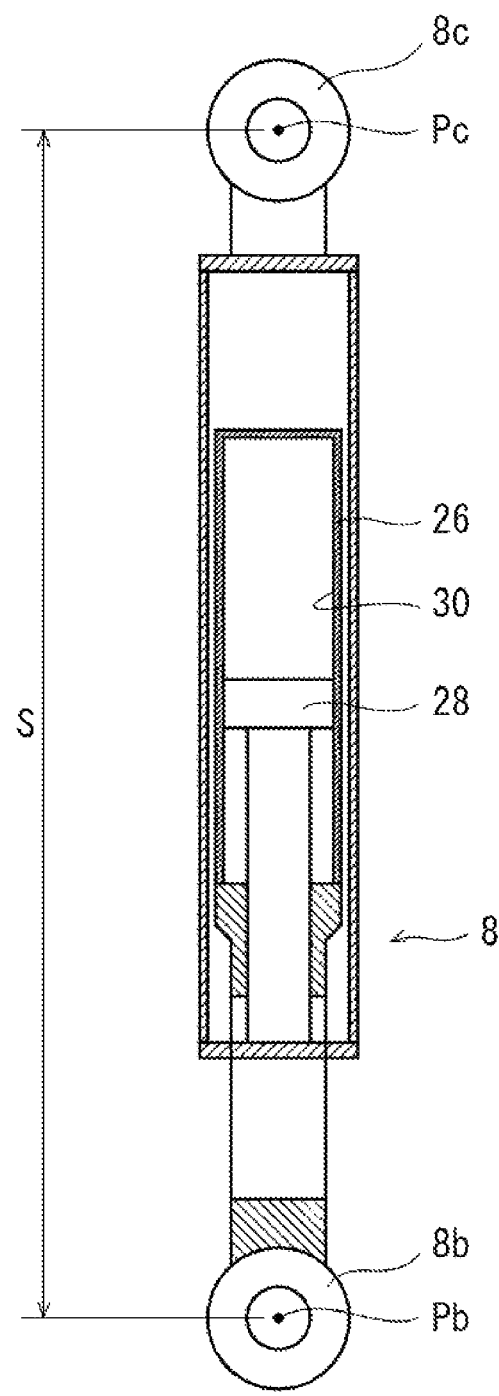

FIG. 2(a) illustrates a working state of the gas spring 8 of FIG. 1. The gas spring 8 includes a cylinder 26 and a piston 28. The cylinder 26 is attached to the base-end part 8b. The piston 28 is attached to the tip-end part 8c. The piston 28 is slidably inserted into the cylinder 26. The piston 28 and the cylinder 26 form a gas chamber 30 in which high-pressure gas is enclosed. Although the gas is not particularly limited, it is inert gas, for example.

FIG. 2(b) illustrates a working state of the gas spring 8 when a full length of the gas spring 8 illustrated in FIG. 2(a) is expanded. The distance S in FIG. 2(b) is larger than the distance S in FIG. 2(a). In FIG. 2(b), the full length of the gas spring 8 expands so that a volume of the gas chamber 30 decreases. In the working state of FIG. 2(b), the gas in the gas chamber 30 is compressed compared with the working state in FIG. 2(a). In the gas spring 8 illustrated in FIG. 2(b), a larger force acts in a direction where the full length of the gas spring 8 contracts, compared with the gas spring illustrated in FIG. 2(a).

Note that in this gas spring 8, the force in the contracting direction of the full length of the gas spring 8 acts when the full length expands. The base-end part 8b of the gas spring 8 may be attached pivotably to the second arm 14, instead of the first arm 12, and the tip-end part 8c of the gas spring 8 may be attached pivotably to the first arm 12, instead of the second arm 14. The gas spring 8 at least demonstrates a function to support a load acting on the second arm 14 so as to reduce a load of the drive motor M2. In the gas spring 8, a force in an expanding direction of the full length of the gas spring 8 may act when the full length contracts. The gas spring 8 may reduce the load of the drive motor M2 by acting the force in the expanding direction of the full length of the gas spring 8 when the full length contracts.

Figure 3:
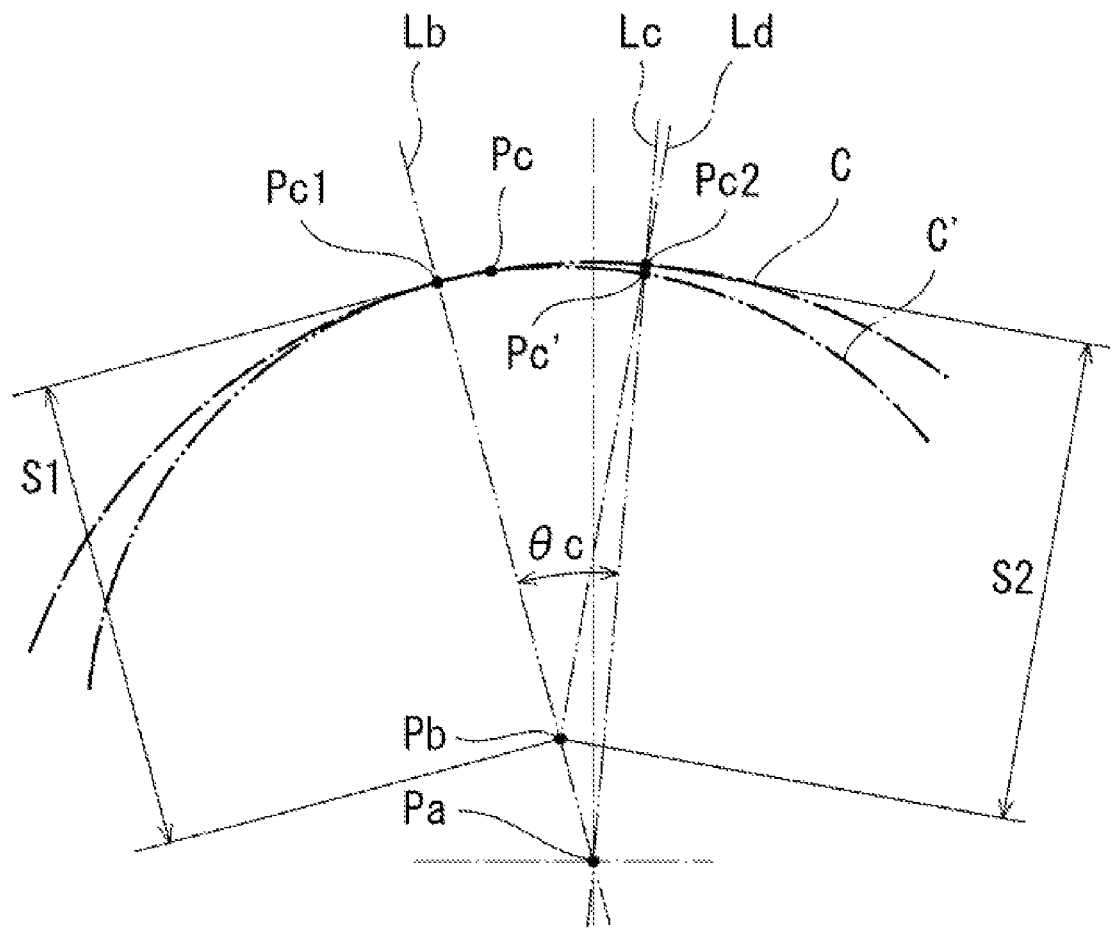
FIG. 3 is an explanatory diagram illustrating the working state of the gas spring of the robot of FIG. 1.

FIG. 3 illustrates a positional relationship between the rotary centers Pa, Pb, and Pc of the robot 2 of FIG. 1. In FIG. 3, the positional relationship between the rotary centers Pa, Pb, and Pc is illustrated so as to be projected on a plane parallel to the drawing sheet of FIG. 1. A one-dot line C indicates a locus of the rotary center Pc which moves accompanying with the rotation of the second arm 14. The locus C is an arc shape centering on the rotary center Pa. A two-dot line Lb indicates a reference line. The reference line Lb is a straight line extending so as to pass though the rotary center Pa and the rotary center Pb.

A reference character "Pc1" is an intersecting point between the locus C and the reference line Lb. A two-dot line C' indicates a locus in an arc shape inscribed in the locus C at the intersecting point Pc1 centering on the rotary center Pb. A double-headed arrow S1 indicates a distance between the rotary center Pb and the intersecting point Pc1. In FIG. 3, the distance Si is obtained as a straight distance between the rotary center Pb and the intersecting point Pc1. The distance Si is a radius of the locus C'.

A two-dot line Lc indicates an imaginary line. The imaginary line Lc is a straight line extending in a radial direction of the locus C passing through the rotary center Pa. A reference character "Pc2" is an intersecting point between the locus C and the imaginary line Lc. A two-dot line Ld is a straight line extending so as to pass through the rotary center Pb and the intersecting point Pc2. A reference character "Pc" indicates an intersecting point between the straight line Ld and the locus C'. A double-headed arrow S2 indicates a distance between the rotary center Pb and the intersecting point Pc2. In FIG. 3, the distance S2 is obtained as a straight distance between the rotary center Pb and the intersecting point Pc2. A double-headed arrow θc indicates an angle between the reference line Lb and the imaginary line Lc. In FIG. 3, the angle θc is 0° on the reference line Lb, and indicated as positive in a clockwise direction while indicated as negative in a counterclockwise direction.

In the robot 2, when the second arm 14 rotates and the rotary center Pc in FIG. 1 moves to the intersecting part Pc1, the distance S of the gas spring 8 is the distance S1. The distance S1 is a minimum value of the distance S. Moreover, when the second arm 14 rotates and the rotary center Pc moves to the intersecting point Pc2, the distance S is the distance S2. At this time, the distance S of the gas spring 8 is extended from the distance S1 to the distance S2. The gas spring 8 is expanded by a difference between the distance S1 and the distance S2 (S2−S1).

That is, by the rotary center Pc moving from the intersecting point Pc1 to the intersecting point Pc2, the distance S of the gas spring 8 is extended by the difference (S2-S1). At this time, gas is compressed so that the gas spring 8 generates the force in the contracting direction of the full length thereof. Therefore, the gas spring 8 supports the load acting on the rotating second arm 14 and demonstrates the function to reduce the load of the driving motor M2.

FIG. 4(a) schematically illustrates a torque Tm generated by the drive motor M2, and a torque Tg generated by the gas spring 8. FIG. 4(a) illustrates the torque Tm and the torque Tg of the robot 2 in a certain posture when the second arm 14 rotates. FIG. 4(a) illustrates the torque Tm and the torque Tg in an initial setting state when leaking of gas does not occur. In this rotating state, the second arm 14 performs a given rotating operation by the torque Tg and the torque Tm acting on the second arm 14.

FIG. 4(b) illustrates the torque Tm and the torque Tg when a part of the gas leaks. FIG. 4(b) illustrates the torque Tm and the torque Tg of the robot 2 in the same posture as FIG. 4(a). In FIG. 4(b), the torque Tg which is generated by the gas spring 8 decreases due to the leak of gas. The torque Tg decreases by a reduced amount ΔT. The torque Tm generated by the drive motor M2 increases so that the second arm 14 performs the given rotating operation. This torque Tm increases by the reduced amount ΔT.

In this robot 2, the angle θc is defined according to the posture of the second arm 14 (see FIG. 3). The distance S of the gas spring 8 is also uniquely defined. Therefore, in the initial state in which gas does not leak, the torque Tg of the gas spring 8 is also defined by the posture of the second arm 14. Based on the torque Tg defined by the posture of the second arm 14, the torque Tm generated by the drive motor M2 is also uniquely defined. Moreover, when the torque Tm is defined, the current value to be supplied to the drive motor M2 can be calculated based on a current-torque characteristic of the drive motor M2.

As illustrated in FIG. 4(b), when a part of gas leaks and the gas pressure decreases in the gas spring 8, the torque Tg of the gas spring 8 decreases. This reduced amount ΔT of the torque Tg is compensated by increasing the torque Tm of the drive motor M2 in order to cause the second arm 14 to perform the given operation. This increased torque Tm can be calculated from an actual current value of the drive motor M2 based on the current-torque characteristic of the drive motor M2.

Here, a method of estimating a reduced state of gas according to the present disclosure is described by using the robot 2. The method of estimating the reduced state of gas is a method of estimating the reduced amount of gas in the gas spring 8 at an arbitrary timing after starting the use of the gas spring 8 of the robot 2.

The method of estimating the reduced state of gas includes a preparing process (STEP1), an actual current acquiring process (STEP2), and an estimating process (STEP3).

In the preparing process (STEP1), the controller 10 stores a coefficient K calculated in advance. This coefficient K is calculated based on an actual current value Im and a theoretical current value Ii (described later). The actual current value Im is obtained as an actual current value of the drive motor M2 which is driving. The theoretical current value Ii is obtained as a calculated current value of the drive motor M2. The coefficient K is calculated as a ratio of the theoretical current value Ii to the actual current value Im (Ii/Im).

The theoretical current value Ii is a current value to be supplied to the drive motor M2 when the gas spring 8 is in an initial setting state at a gas pressure Pi. In this setting state, the torque Tm to be generated by the drive motor M2 is uniquely defined according to a rotational posture of the second arm 14. The theoretical current value Ii can be calculated based on the torque Tm to be generated by the drive motor M2 on the basis of the current-torque characteristic of the drive motor M2. Conventionally, the theoretical current value Ii is calculated considering a dynamic friction force, and is stored by the controller 10 for the purpose of detecting collision.

For example, the controller 10 acquires the actual current values Im of the drive motor M2 from the current sensor C2 in a plurality of postures of the second arm 14 in different rotating states. The controller 10 calculates and stores the theoretical current values Ii of the drive motor M2 corresponding to the respective postures. The controller 10 calculates the ratios (Ii/Im) based on the theoretical current values Ii and the corresponding actual current values Im. The controller 10 calculates the coefficient K as an average value of these ratios (Ii/Im). If a variation in the coefficient K is small, the controller 10 stores this coefficient K.

If the variation in the coefficient K is large, for example, areas are set by subdividing a range of the posture of the rotating second arm 14. The coefficient K is calculated for every set area. These areas may be obtained by subdividing not only the range of the posture of the second arm 14, but also including postures of the first arm 12 to the sixth arm 22. In this case, the controller 10 stores the set areas and the coefficients K associated with the areas.

The actual current value acquiring process (STEP2) includes a determining process (STEP2-1) and a rotary actual current value acquiring process (STEP2-2). In the actual current value acquiring process (STEP2), the controller 10 determines whether the second arm 14 rotates. In the rotary actual current value acquiring process (STEP2-2), the controller 10 acquires the actual current value Im during the rotation of the second arm 14. This actual current value Im may particularly be referred to as a "rotary actual current value Ir."

For example, in this actual current value acquiring process (STEP2), the controller 10 acquires the actual current values Im in the series of operation of the robot 2. The actual current value Im is acquired, for example, as an average value of current values over a given period of time while the second arm 14 rotates. This average current value can be calculated by dividing an integrated value of the current values over the given period of time, by this given period of time. The given period of time may be a few seconds, or a few minutes.

The controller 10 stores the actual current value Im (rotary actual current value Tr) when the second arm 14 does not stop but rotates, among the actual current values Im corresponding to the series of operation.

Note that the method of acquiring the rotary actual current value Tr described above is one example, and it is not limited to this. In this method, the controller 10 at least acquires the rotary actual current value Tr of the second arm 14, which does not include the actual current value Im when the second arm 14 stops. For example, the controller 10 may determine whether the second arm 14 rotates before acquiring the actual current value Im. Then, the controller 10 may acquire the actual current value Im when the second arm 14 rotates.

In the estimating process (STEP3), the controller 10 estimates the reduced state of gas in the gas spring 8. The controller 10 estimates the reduced state of gas, for example, by calculating a reduced pressure ΔP of the gas pressure. In detail, the controller 10 calculates the reduced pressure ΔP of the gas pressure based on the coefficient K, the rotary actual current value Tr, the theoretical current value Ii, and an imaginary current value Ig (described below) during the rotation of the second arm 14.

The imaginary current value Ig is a current value when the torque Tg of the gas spring 8 is generated by the drive motor M2. In the setting state of the gas spring 8 at the initial gas pressure Pi, the torque Tg to be generated by the gas spring 8 is uniquely defined. In this setting state, the torque Tg is defined according to the rotational posture of the second arm 14. The imaginary current value Ig when the torque Tg is generated by the drive motor M2 is calculated based on the current-torque characteristic of the drive motor M2.

Figure 4:
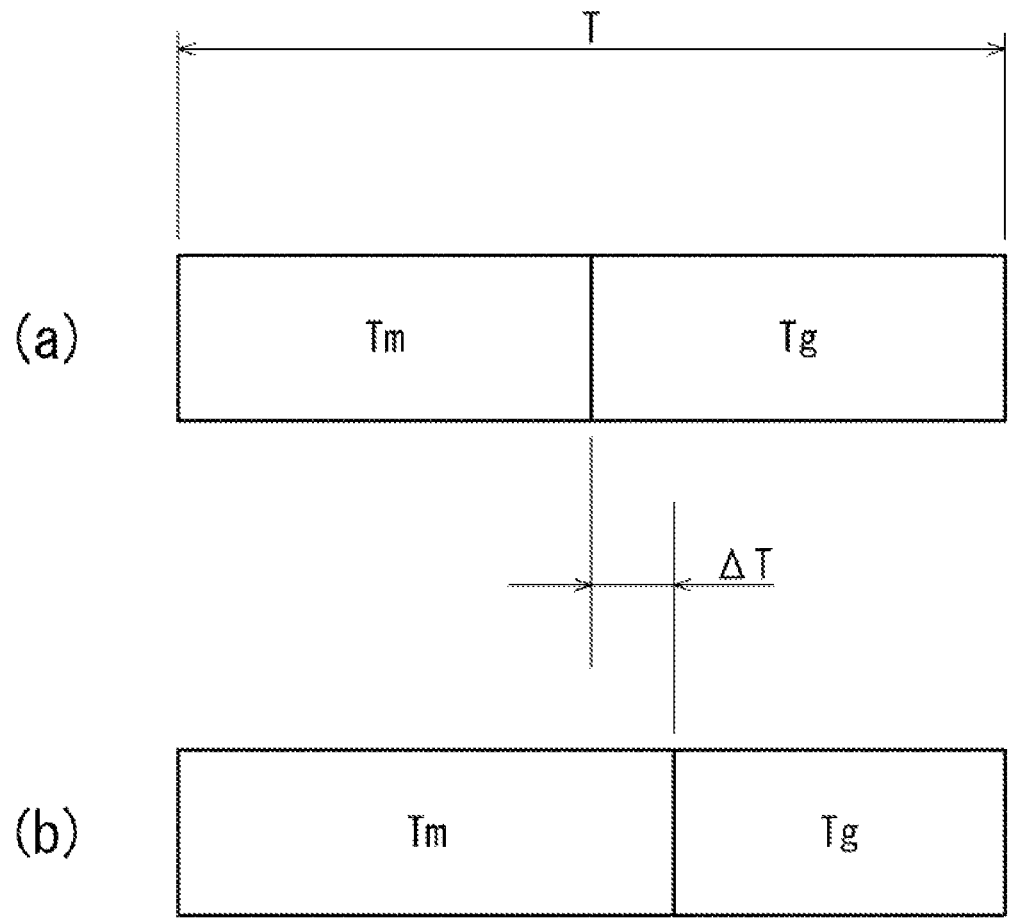
FIG. 4(a) is an explanatory diagram illustrating a relationship between a torque of the gas spring and a torque of a drive motor of the robot of FIG. 1 in an initial setting state.
FIG. 4(b) is an explanatory diagram illustrating a relationship between the torque of the gas spring and the torque of the drive motor in a reduced state of gas.

As illustrated in FIGS. 4(*a*) and 4(*b*), when the gas pressure of the gas spring 8 decreases, the torque Tm of the drive motor M2 increases by the reduced amount ΔT in order to cause the second arm 14 to perform the given operation. The actual current value Im (the rotary actual current value Ir) of the drive motor M2 increases according to the increase in the reduced amount ΔT. Therefore, the controller 10 can calculate a lowering rate Gp of the gas pressure in the gas spring 8 based on Formula (1) described below. Furthermore, the controller 10 can calculate the reduced pressure ΔP of the gas pressure when the initial gas pressure is Pi based on Formula (2) described below.

$$Gp=(K \cdot Im-Ii)/Ig \qquad (1)$$

$$\Delta P=Pi \cdot Gp \qquad (2)$$

The controller 10 stores a threshold ΔPr of the reduced pressure ΔP. In the estimating process (STEP3), the robot 2 alerts by a warning device (not illustrated) when the reduced pressure ΔP is at or above the threshold ΔPr. Then, when the robot 2 returns to a given stop position, it stops and becomes a stand-by state.

The robot 2 estimates the reduced pressure ΔP based on the comparison between the actual current value Im (the rotary actual current value Ir) and the theoretical current value Ii when the second arm 14 rotates. The robot 2 estimates the reduced pressure ΔP without using the actual current value Im when the second arm 14 stops.

When the second arm 14 stops, a static friction force acts on the second arm 14. Because this static friction force acts on the second arm 14, the torque Tm and the actual current value Im of the drive motor M2 vary when the second arm 14 stops. This variation easily causes an error to the reduced pressure ΔP estimated based on the actual current value Im when the second arm 14 stops. The controller 10 of the robot 2 estimates the reduced pressure ΔP based on the actual current value Im (the rotary actual current value Ir) when the second arm 14 rotates. The static friction force does not act on the rotating second arm 14, but a constant dynamic friction force acts on the rotating second arm 14. When the second arm 14 is in the rotating state in which the dynamic friction force acts, the increase and decrease in the torque Tm of the drive motor M2 increases and decreases a rotating speed of the second arm 14. When the second arm 14 rotates, the increase and decrease in the actual current value Im of the drive motor M2 increases and decreases the rotating speed of the second arm 14. The controller 10 can highly precisely estimate the reduced pressure ΔP by estimating the reduced pressure ΔP based on the actual current value Im (the rotary actual current value Ir) of the rotating second arm 14. The controller 10 of the robot 2 can highly precisely estimate the reduced state of gas in the gas spring 8.

The robot 2 can estimate the reduced pressure ΔP at an arbitrary timing during the operation. The robot 2 does not require any special operation to estimate the reduced state of gas. The robot 2 can estimate the reduced state of gas without stopping a manufacturing line. Moreover, the robot 2 can instantly estimate the reduced pressure ΔP during the operation, and instantly alert when the reduced state of gas becomes a given state. The robot 2 can prevent in advance a malfunction and a breakdown of the gas spring 8 due to the decrease in the amount of gas.

When a fluctuation of an angular acceleration of the drive motor M2 is large, a fluctuation of the measured actual current value Im of the drive motor M2 is also large. This actual current value Im with the large fluctuation lowers the accuracy of estimating the reduced pressure ΔP. In terms of improving the estimating accuracy, a rate of change in the angular acceleration per unit time (i.e., the fluctuation of the angular acceleration) is preferred to be small. In this aspect, the controller 10 is preferred to include a function to determine a magnitude of the fluctuation of the angular acceleration. It is preferred that the controller 10 includes a function to estimate the reduced pressure ΔP based on the actual current value Im when the fluctuation of the angular acceleration is at or below a given absolute value, not including the actual current value Im when the fluctuation of the angular acceleration exceeds the given absolute value.

Moreover, when the gas spring 8 expands in a small amount, a compressibility of gas is small. The gas spring 8 with the small compressibility lowers the accuracy of estimating the reduced pressure ΔP of the gas pressure. On the other hand, when the gas spring 8 expands in a large amount, the reduced pressure ΔP can be estimated highly precisely. In this aspect, it is preferred to acquire the actual current value Im of the drive motor M2 when an absolute value of the angle θc between the reference line Lb and the imaginary line Lc of FIG. 3 is large. In terms of highly precisely estimating the reduced pressure ΔP, the absolute value of the angle θc is preferably at or larger than 20°, further preferably at or larger than 25°, and particularly preferably at or larger than 30°.

In terms of highly precisely estimating the reduced pressure ΔP, the reduced pressure ΔP is preferred to be estimated in the gas spring 8 with the large compressibility of gas. The reduced pressure ΔP is preferred to be estimated in the gas spring 8 generating a large torque Tg. It is preferred that the reduced pressure ΔP is estimated based on the actual current value Im when the second arm 14 is in a posture in which the torque Tg at or above 25% of the maximum torque Tgmax to be generated by the gas spring 8 is generated. The reduced pressure ΔP is preferred to be estimated based on the actual current value Im when the torque Tg at or above 25% of the maximum torque Tgmax is generated, not including the actual current value Im when the torque Tg below 25% of the maximum torque Tgmax is generated. The maximum torque Tgmax is the maximum value which can be generated by the gas spring 8 of the robot 2.

Here, although the reduced pressure ΔP of the gas pressure is estimated, the reduced state of gas estimated in the present disclosure is not limited to this. The reduced state of gas is estimated at least based on the comparison between the actual current value Im and the theoretical current value Ii of the drive motor M2 when the second arm 14 rotates. The lowering rate Gp of the gas pressure, the gas pressure in the gas spring 8, an amount of gas inside the gas chamber 30, or an amount of gas leaked from the gas chamber 30 may be acquired as the reduced state of gas. Furthermore, the comparison between the actual current value Im and the theoretical current value Ii when the drive motor M2 rotates may be directly used as the indication of the reduced state of gas.

Although in the robot 2 the second arm 14 is described as the rotary arm and the first arm 12 is described as the arm supporting part according to the present disclosure, it is not limited to this. For example, a gas spring may be provided between the second arm 14 and the third arm 16 so that the second arm 14 is the arm supporting part, and the third arm 16 is the rotary arm. Similarly, a gas spring may be provided between the fourth arm 18 and the fifth arm 20 so that fourth arm 18 is the arm supporting part and the fifth arm 20 is the rotary arm. Here, although the robot 2 according to the present disclosure is the multi-articulated robot, it is at least an articulated robot provided with the arm supporting part and the rotary arm.

Figure 5:
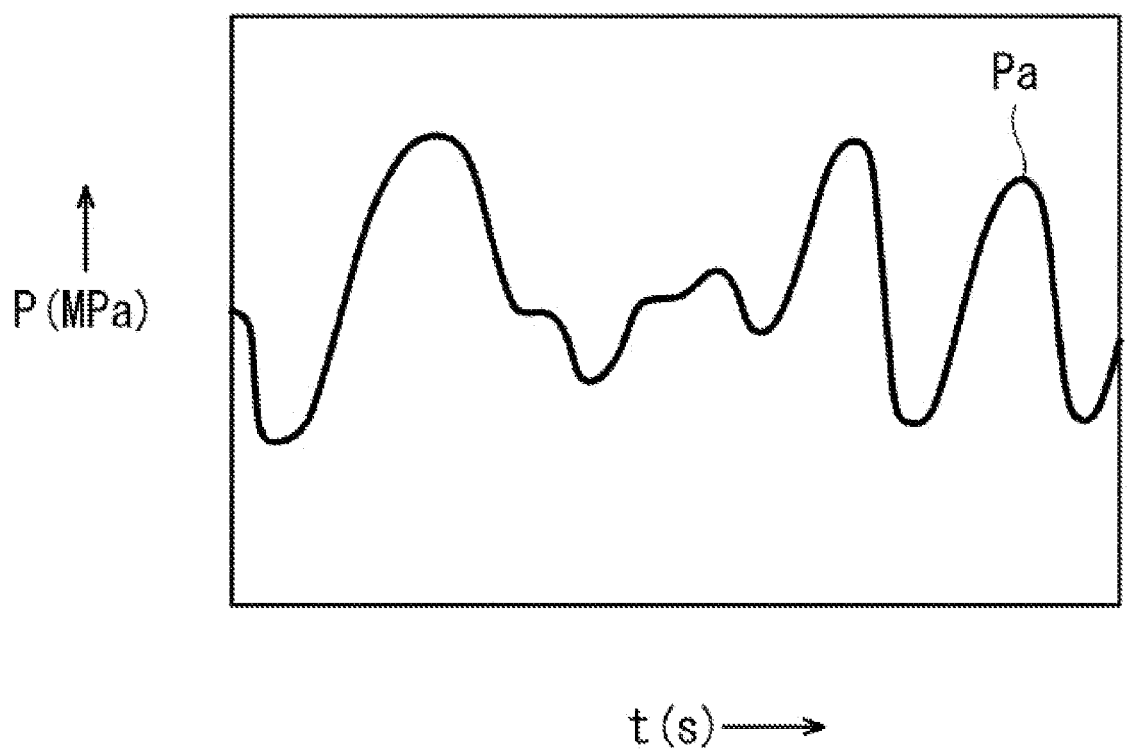
FIG. 5 is an explanatory diagram illustrating a change in a pressure Pa in the gas spring during an operation of the robot of FIG. 1.

FIG. 5 is a graph illustrating a change in a gas pressure Pa in the gas spring 8 when the robot 2 performs a certain operation. A horizontal axis in the graph indicates time t(s) and a vertical axis indicates a pressure P(MPa). The gas spring 8 expands and contracts according to the rotation of the second arm 14 of the robot 2. As illustrated in FIG. 5, the gas pressure Pa in the gas spring 8 increases and decreases according to the rotation of the second arm 14.

[Test 1]

Figure 6:
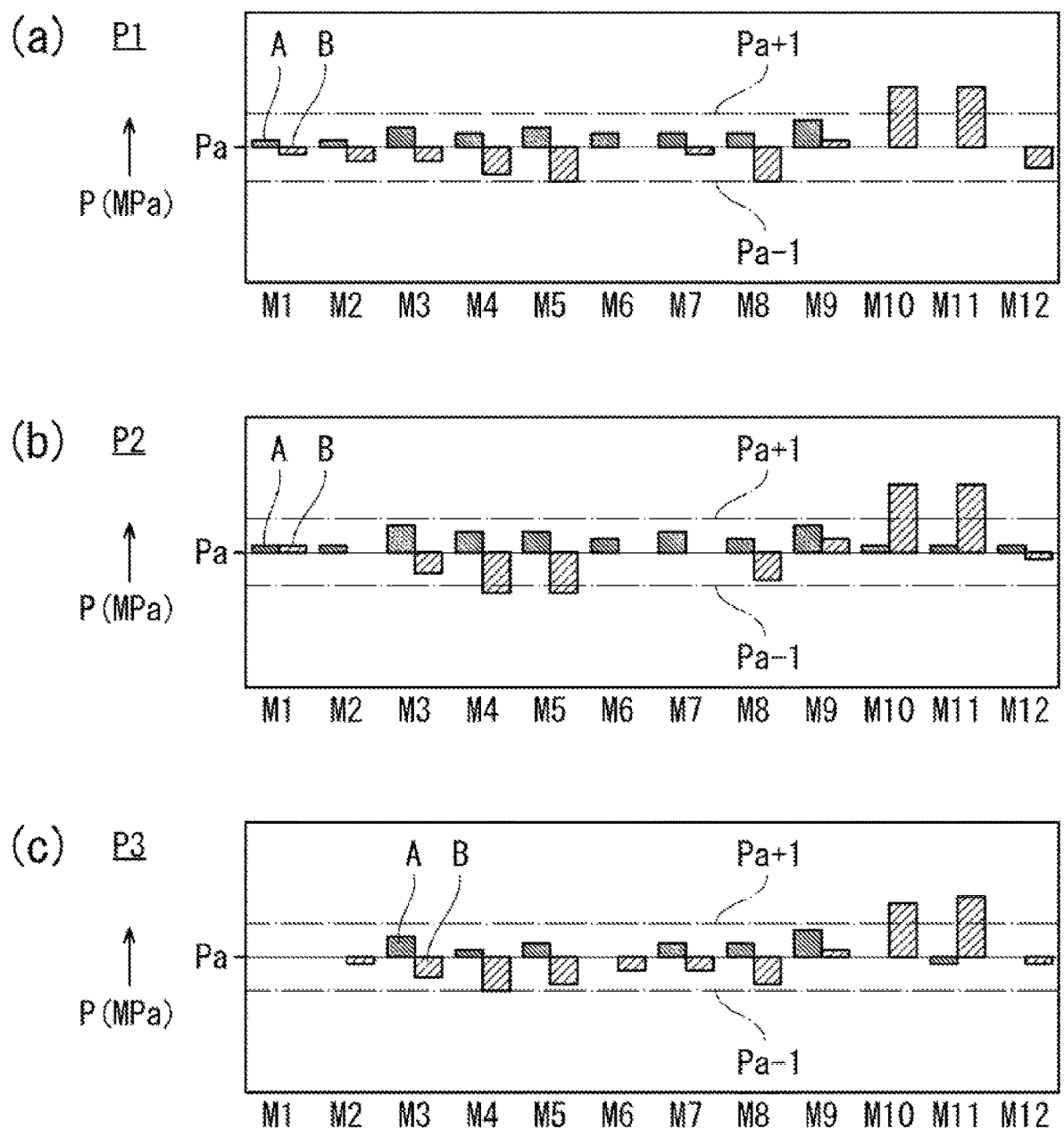
FIG. 6(a) is a graph illustrating gas pressures estimated using the robot of FIG. 1 in a method according to the present disclosure and gas pressures estimated in a conventional method at a gas pressure P1.
FIG. 6(b) is a graph illustrating gas pressures estimated in the method according to the present disclosure and gas pressures estimated in the conventional method at another gas pressure P2.
FIG. 6(c) is a graph illustrating gas pressures estimated in the method according to the present disclosure and gas pressures estimated in the conventional method at still another gas pressure P3.

FIG. 6(a) illustrates a difference between the gas pressure estimated in the estimating method according to the present disclosure and an actual gas pressure Pa, and a difference between a gas pressure estimated in a conventional estimating method and the actual gas pressure Pa. In FIG. 6(a), the gas pressures in the gas spring 8 are estimated during twelve different operations (M1-M12). The differences in the gas pressure indicated by striped areas with a reference character "A" are based on the estimating method according to the present disclosure. The differences in the gas pressure indicated by striped areas with a reference character "B" are based on the conventional estimating method. According to the conventional estimating method, the reduced pressure ΔP is estimated based on the actual current value Im when the drive motor M2 operates and the second arm 14 stops. The difference between the gas pressure based on this reduced pressure ΔP and the actual gas pressure Pa is calculated. In FIG. 6(a), the initial setting sate of the gas pressure in the gas spring 8 is set to P1 (11(MPa)). In FIG. 6(a), the pressure P is indicated by a solid line as a reference line, and a pressure Pa+1(MPa) and a pressure Pa−1(MPa) are indicated by dotted lines.

As illustrated in FIG. 6(a), the differences in the gas pressure estimated in the estimating method according to the present disclosure are smaller than those estimated in the conventional estimating method in eight operations M1, M2, M4, M5, M8, M10, M11, and M12 among the twelve operations. Furthermore, in all of the operations, the differences between the gas pressures estimated in the estimating method according to the present disclosure and the gas pressures Pa are at or below 1(MPa). On the other hand, the differences between the gas pressures estimated in the conventional estimating method and the gas pressures Pa exceed 1(MPa) in the operations M11 and M12. According to the estimating method of the present disclosure, the reduced state of gas can be estimated highly precisely compared with the conventional method.

FIGS. 6(b) and 6(c) illustrate the differences in the gas pressure obtained similarly to the estimating method in FIG. 6(a), except for changing the gas pressure in the gas spring 8 in the initial setting state. In FIG. 6(b), the initial setting state of the gas pressure in the gas spring 8 is set to P2 (9(MPa)). In FIG. 6(c), the initial setting state of the gas pressure in the gas spring 8 is set to P3 (7(MPa)). As illustrated in FIGS. 6(b) and 6(c), according to the estimating method of the present disclosure, the reduced state of gas can be highly precisely estimated even when the gas pressure in the gas spring 8 decreases.

[Test 2]

Figure 7:
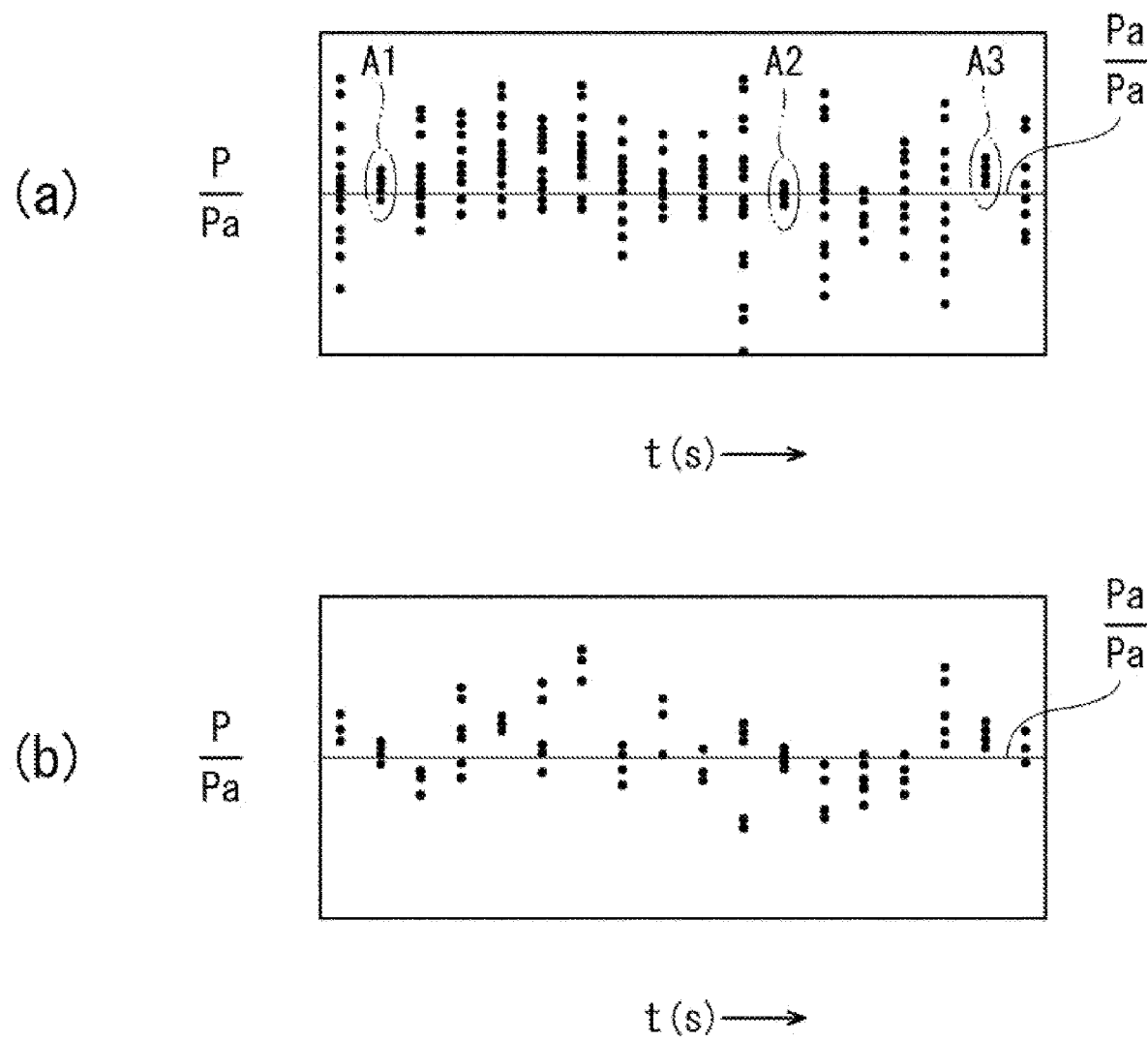
FIG. 7(a) is a graph illustrating a distribution of the gas pressures estimated in the method according to the present disclosure using the robot of FIG. 1.
FIG. 7(b) is a graph illustrating a distribution of gas pressures estimated in another method according to the present disclosure.

FIG. 7(a) illustrates a relationship between the gas pressure estimated in the estimating method according to the present disclosure and the actual gas pressure Pa. The gas pressures in FIG. 7(a) are estimated based on the actual current values Im when the second arm 14 rotates. In FIG. 7(a), a horizontal axis indicates time t(s) and a vertical axis indicates a ratio of the gas pressure P to the actual gas pressure Pa (P/Pa). A straight line (Pa/Pa) indicates a ratio of the actual gas pressure Pa to the gas pressure Pa (Pa/Pa), as a reference line. Each black point indicates the ratio between the estimated gas pressure and the gas pressure Pa.

In FIG. 7(a), variations in the estimated gas pressure are smaller in areas A1, A2, and A3, which are indicated by two-dot lines, compared to other areas. In these areas A1, A2 and A3, the gas pressures are estimated based on the actual current values Im (the rotary actual current values Ir) measured in the state where the angular acceleration is constant. These areas A1, A2, and A3 indicate that the variations are small when the gas pressures are estimated based on the actual current values Im in the state where the angular acceleration of the drive motor M2 is constant. In terms of highly precisely estimating the reduced state of gas in the gas spring 8, the controller 10 is preferred to include a function to determine the magnitude of the angular acceleration of the derive motor M2. It is preferred that the controller 10 includes a function to estimate the reduced state of gas based on the actual current value Im in the state where the angular acceleration of the drive motor M2 is constant, not including the actual current value Im when the angular acceleration varies.

FIG. 7(b) illustrates a relationship between a gas pressure estimated in another estimating method according to the present disclosure and the actual gas pressure Pa. In FIG. 7(b), the actual current values Im (the rotary actual current values Ir) when the magnitude of the variation in the angular acceleration of the drive motor M2 is at or below the given absolute value, are used. Except for that, the ratios between the estimated gas pressures and the gas pressures Pa are calculated similarly to the estimating method of FIG. 7(a).

Sizes of scales on the vertical axes and the horizontal axes are the same between FIGS. 7(a) and 7(b). The variations in the estimated gas pressure in FIG. 7(b) are smaller than those in FIG. 7(a). In terms of highly precisely estimating the reduced state of gas in the gas spring 8, the controller 10 is preferred to include the function to determine the magnitude of the fluctuation of the angular acceleration of the drive motor M2. It is preferred that the controller 10 includes a function to estimate the reduced state of gas based on the actual current value Im when the fluctuation of the angular acceleration of the drive motor M2 is at or below the given absolute value, not including the actual current value Im when the fluctuation of the angular acceleration exceeds the given absolute value.

[Test 3]

Figure 8:
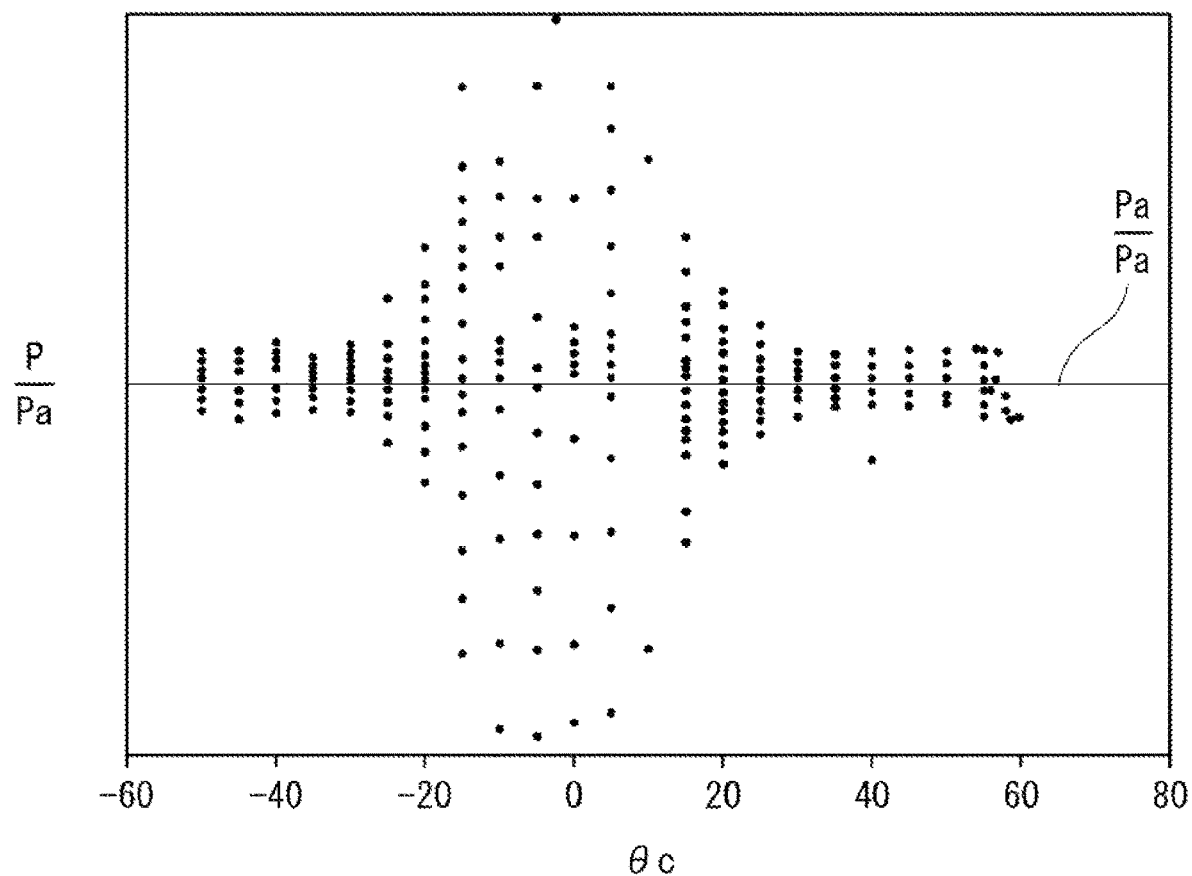
FIG. 8 is a graph illustrating a relationship between the gas pressure estimated in the method according to the present disclosure using the robot of FIG. 1, and an angle θc of a second arm.

FIG. 8 illustrates a relationship between the gas pressure estimated in the estimating method according to the present disclosure and the angle θc (see FIG. 3). In FIG. 8, a horizontal axis indicates the angel θc, and the vertical axis indicates the ratio of the gas pressure P to the actual gas pressure Pa (P/Pa). The straight line (Pa/Pa) indicates the ratio of the actual gas pressure Pa to the gas pressure Pa (Pa/Pa), as a reference line. Each black point indicates the ratio between the estimated gas pressure and the gas pressure Pa.

FIG. 8 indicates that the variations in the estimated gas pressure are small in a range in which the absolute value of the angle θc is large. The variations in the estimated gas pressure are apparently smaller when the absolute value of the angle θc is at or above 20°. The variations in the estimated gas pressure are further smaller when the absolute value of the angle θc is at or above 25°, and are particularly smaller when the absolute value is at or above 30°.

In terms of highly precisely estimating the reduced state of gas, the controller 10 is preferred to include a function to determine the absolute value of the angle θc. It is preferred that the controller 10 estimates the reduced state of gas based on the actual current value Im when the angle θc is at or larger than a given angle. The given angle is preferably at or larger than 20°, is further preferably at or larger than 25°, and is particularly preferably at or larger than 30°.

Moreover, FIG. 8 indicates that the reduced state of gas may be highly precisely estimated by estimating the reduced pressure ΔP of the gas spring 8 with the high compressibility of gas. In this aspect, the reduced pressure ΔP is preferred to be estimated when the gas spring 8 generates the large torque Tg. It is preferred that the reduced pressure ΔP is estimated based on the actual current value Im when the second arm 14 is in the posture where the gas spring 8 generates the torque Tg at or above 25% of the maximum torque Tgmax to be generated by the gas spring 8.

DESCRIPTION OF REFERENCE CHARACTERS

2 Robot
4 Pedestal
6 Robotic Arm
8 Gas Spring
8b Base-end Part
8c Tip-end Part
10 Controller
12 First Arm (Arm Supporting Part)
14 Second Arm (Rotary Arm)
16 Third Arm
18 Fourth Arm
20 Fifth Arm
22 Sixth Arm
24 Hand
26 Cylinder
28 Piston
30 Gas Chamber

What is claimed is:

1. An articulated robot, comprising:
    an arm supporting part;
    a rotary arm rotatably supported by the arm supporting part;
    a drive motor configured to rotate the rotary arm;
    a gas spring configured to reduce a load of the drive motor by supporting a load acting on the rotary arm; and
    a controller configured to determine whether the rotary arm is in a rotating state where a dynamic friction force acts on the rotary arm regardless of operating conditions, and configured to estimate a reduced state of gas in the gas spring based on a comparison between an actual current value of the drive motor and a theoretical current value of the drive motor, the actual current value being a current value acquired when the rotary arm is in the rotating state rather than when the rotary arm is at rest.

2. The articulated robot of claim 1, wherein the controller determines a magnitude of a fluctuation in an angular acceleration of the drive motor.

3. The articulated robot of claim 2, wherein the controller uses the actual current value when the rotary arm is in a posture in which the gas spring generates a torque at or above 25% of a maximum torque to be generated by the gas spring.

4. The articulated robot of claim 1, wherein the controller uses the actual current value when the rotary arm is in a posture in which the gas spring generates a torque at or above 25% of a maximum torque to be generated by the gas spring.

5. A method of estimating a reduced state of gas in a gas spring of an articulated robot including:

a rotary arm;
a drive motor configured to drive the rotary arm; and
the gas spring configured to reduce a load of the drive motor by supporting a load acting on the rotary arm,
the method comprising the steps of:
    acquiring an actual current value of the drive motor; and
    estimating the reduced state of gas in the gas spring based on the actual current value,
wherein the acquiring the actual current value includes determining whether the rotary arm is in a rotating state where a dynamic friction force acts on the rotary arm regardless of operating conditions and acquiring the actual current value when the rotary arm is in the rotating state rather than when the rotary arm is at rest, and
wherein the estimating the reduced state of gas includes estimating the reduced state of gas in the gas spring based on a comparison between the actual current value acquired in the acquiring the actual current value, and a theoretical current value.

\* \* \* \* \*